Aug. 22, 1967  F. S. GENBAUFFE  3,337,179
CONTROL DEVICE AND THE LIKE AND PARTS THEREFOR
Filed June 3, 1964  3 Sheets-Sheet 2

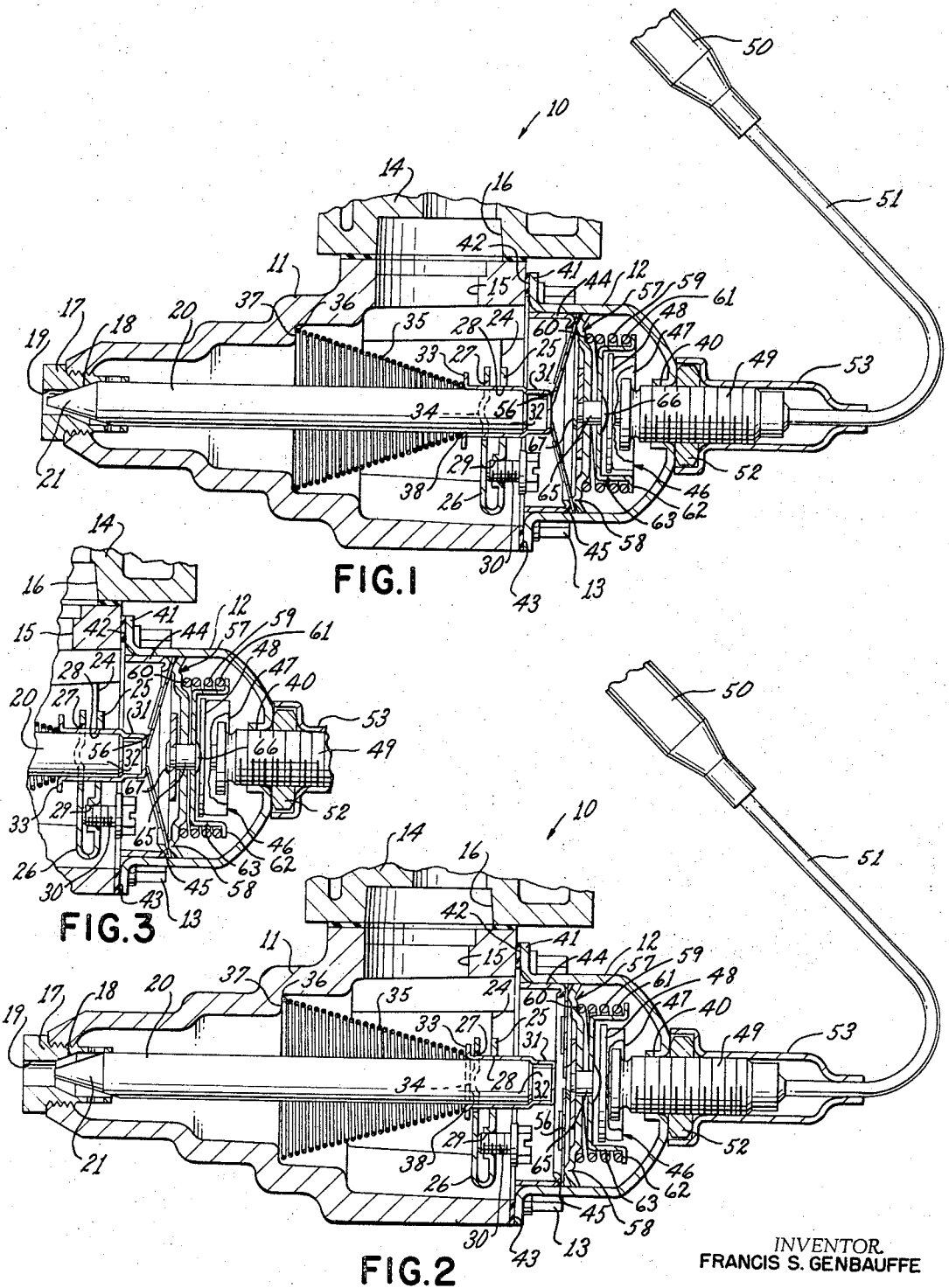

INVENTOR.
FRANCIS S. GENBAUFFE
BY
*Caudn & Caudn*
HIS ATTORNEYS

Aug. 22, 1967  F. S. GENBAUFFE  3,337,179
CONTROL DEVICE AND THE LIKE AND PARTS THEREFOR
Filed June 3, 1964  3 Sheets-Sheet 3

INVENTOR.
FRANCIS S. GENBAUFFE
BY
*Cauden & Cauden*
HIS ATTORNEYS

United States Patent Office 3,337,179
Patented Aug. 22, 1967

3,337,179
CONTROL DEVICE AND THE LIKE AND
PARTS THEREFOR
Francis S. Genbauffe, Irwin, Pa., assignor to Robertshaw Controls Company, Richmond, Va., a corporation of Delaware
Filed June 3, 1964, Ser. No. 372,295
18 Claims. (Cl. 251—77)

This invention relates to an improved control device as well as to improved parts for such a control device or the like.

It is well known that various thermostatically operated valve means can be provided wherein the flow of fluid or fuel through the valve means is regulated in response to the temperature effect produced by the fluid or fuel.

For example, one such means is utilized for domestic gas fired laundry dryers and the like wherein the valve member is moved to a closed position to prevent the flow of fuel therethrough when the temperature inside the dryer exceeds a predetermined temperature value and which moves to an open position when the temperature inside the dryer falls below the predetermined temperature whereby the temperature in the dryer is maintained at a substantially constant predetermined temperature.

It is one of the features of this invention to provide such a control device having many features and advantages heretofore unobtainable in the prior art.

In particular, one embodiment of this invention provides a pair of separate housing members adapted to be detachably secured together, one of the housing members carrying the movable valve means and the other housing means carrying the thermostatically operated motion transmitting means for operating movement of the valve member. In this manner, each housing means and its associated assembly can be separately calibrated so that replacements of only the desired housing assembly need be required in the field without additional adjustments and calibrations being required in the field.

Accordingly, it is an object of this invention to provide an improved control device having one or more of the novel features set forth above or hereinafter shown or described.

Another object of this invention is to provide improved parts for such a control device or the like.

Other objects, uses and advantages of this invention are apparent from a reading of this description which proceeds with reference to the accompanying drawings forming a part thereof and wherein:

FIGURE 1 is a cross-sectional view illustrating the control device of this invention in its closed position.

FIGURE 2 is a view similar to FIGURE 1 and illustrates the control device of its fully open position.

FIGURE 3 is a fragmentary, cross-sectional view similar to FIGURE 1 and illustrates the control device in its overshoot position.

Figure 5:
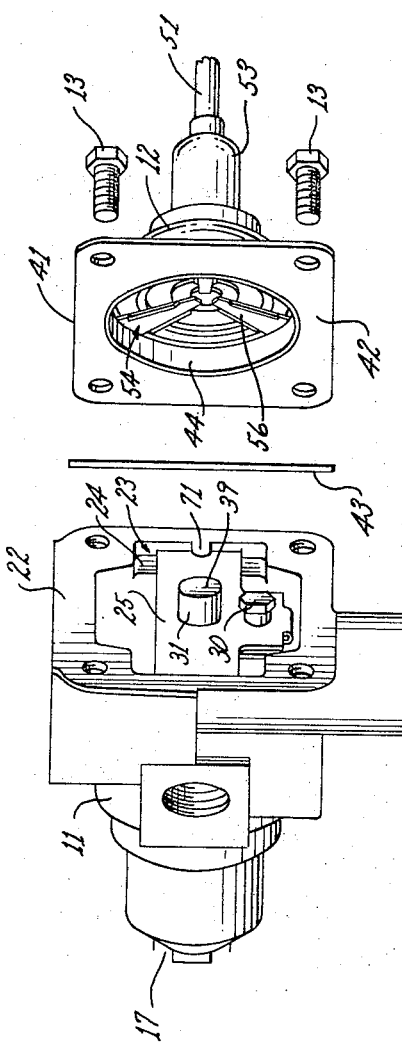
FIGURE 5 is an exploded perspective view illustrating the various parts of the assembly of FIGURE 1.
Figure 4:
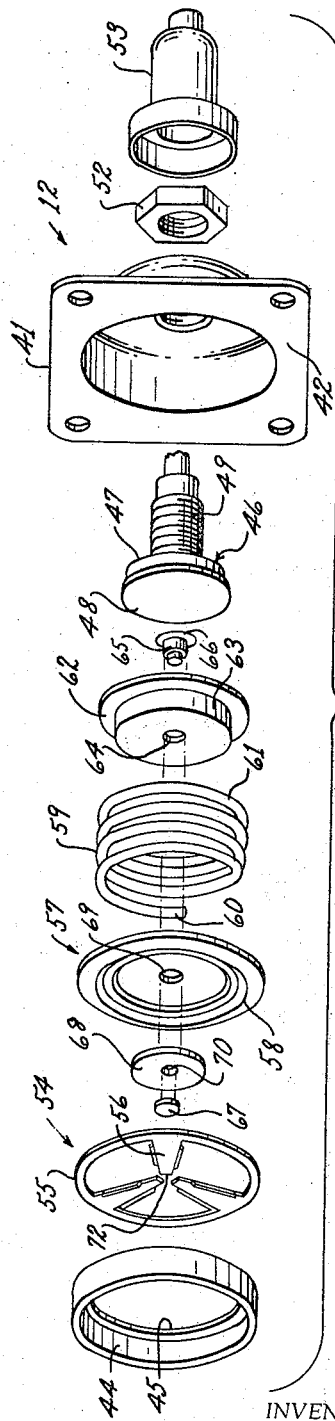
FIGURE 4 is an exploded perspective view illustrating the various parts of one of the housing means of the control device of FIGURE 1.

While the various features of this invention are hereinafter described and illustrated as being particularly adapted for controlling the flow of fuel through a valve means, it is to be understood that the various features of this invention can be utilized singly or in any combination thereof to provide control means for other devices as desired.

Therefore, this invention is not to be limited to only the embodiment illustrated in the drawings, because the drawings are merely utilized to illustrate one of the wide variety of uses of this invention.

Referring now to FIGURE 1, the improved control device of this invention is generally indicated by the reference numeral 10 and comprises a first housing means 11 detachably secured to a second housing means 12 by threaded fastening members 13, the housing means 11, in turn being interconnected to a third housing means 14 by suitable fastening means and having an inlet 15 disposed in fluid communication with an outlet 16 of the housing means 14 whereby fuel or the like is adapted to pass from the housing means 14 into the inlet 15 of the housing means 11 for a purpose hereinafter described.

The housing means 11 has an outlet orifice plug 17 threadedly interconnected thereto, the orifice or seat member 17 having a frusto-conical seating surface 18 interconnected to the outlet 19 thereof. A valve member 20 is movably carried by the housing means 11 and has a substantially frusto-conical tip 21 which is adapted to engage the seat surface 18 of the outlet plug 17 when disposed in the position illustrated in FIGURE 1 and to fully open the same when disposed in the position illustrated in FIGURE 2 for a purpose hereinafter described.

The housing means 11 has a substantially flat end surface 22 interrupted by recesses 23 which define shoulders 24 inwardly offset from the end surface 22 thereof.

A plate-like member 25 is disposed against the shoulders 24 in the manner illustrated in the drawings and is fastened thereto by having portions 71 of the housing means 11 staked or peened over the plate-like member 25. The plate-like member 25 has a resilient looped portion 26 provided with an opening 27 aligned with an opening 28 formed in the plate-like member 25, the plate-like member 25 having a threaded opening 29 receiving a threaded adjusting member 30 for adjusting the position of the looped portion 26 relative thereto for a purpose hereinafter described.

A cup shaped retainer 31 is press fitted over the end 32 of the valve member 20 and has an outwardly directed annular flange 33 at the open end thereof which is adapted to abut against a dimpled portion 34 of the looped portion 26 of the plate-like member 25 when the valve member 30 is moved to its fully opened position in the manner illustrated in FIGURE 2. A compression spring 35 is disposed in the housing means 11 and has one end 36 thereof engaging against a shoulder 37 of the housing means 11 and the other end 38 thereof bearing against the annular flange 33 of the cup shaped retainer 31. In this manner, the force of the compression spring 35 tends to move the valve member 20 from its seated position illustrated in FIGURE 1 to its fully open position illustrated in FIGURE 2 where the annular flange 33 of the cup shaped retainer 31 abuts against the dimpled means 34 of the loop portion 26 of the plate like member 25.

Thus, it can be seen that the amount of movement of the valve member 20 from the position illustrated in FIGURE 1 to the right is controlled by the position of the looped portion 26 of the plate-like member 25 relative to the housing 11, the position of the loop portion 26 being controlled by the adjusting screw 30.

Figure 6:
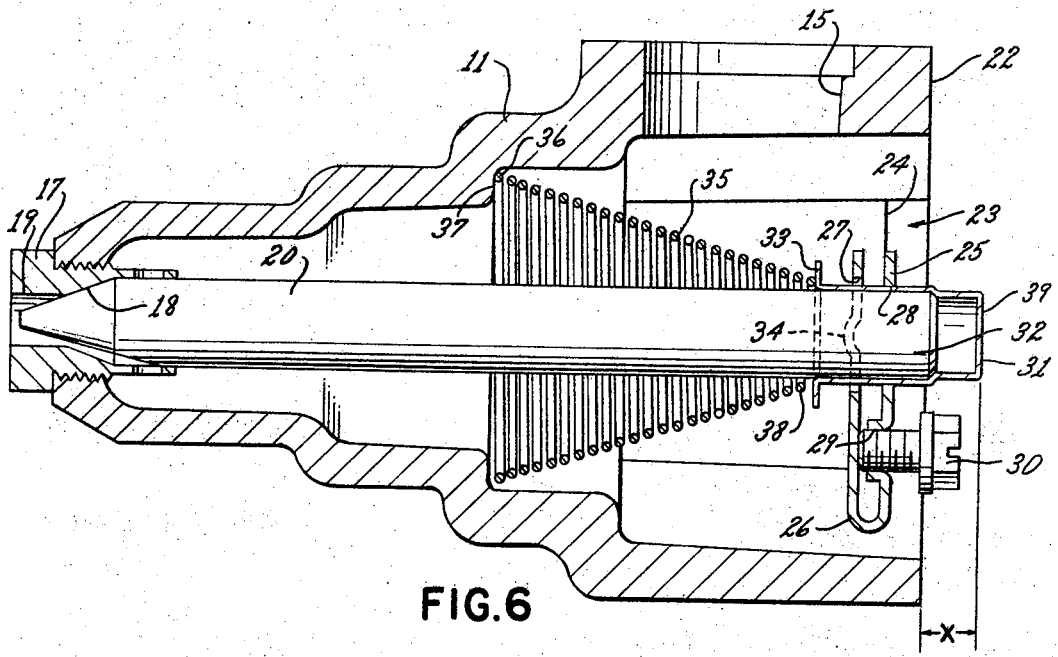
FIGURE 6 is an enlarged, cross-sectional view of one of the housing means and its associated parts of the control device of FIGURE 1.

It is a relatively simple and easy method to calibrate the valve member 20 in the housing means 11 because the cup shaped retainer 31 can be pushed on the end 32 of the valve member 20 in such a manner that with the valve member 20 being seated against the orifice part 17, the end wall 39 of the cup shaped retainer 31 can be disposed approximately 0.160+ or −.002 of an inch from the end wall 22 of the housing means 11 as illustrated by the reference letter X in FIGURE 6 whereby each housing means 11 and its associated parts can be calibrated in a like manner without requiring calibration thereof in combination with the housing means 12 and its associated parts.

The housing means 12 comprises a cup shaped member having a threaded opening 40 passing through the closed end thereof and having an outwardly directed annular flange 41 defining a flat end wall surface 42 adapted to be secured to the end wall surface 22 of the housing means 11 by threaded fastening members 13, a sealing gasket 43 being disposed between the surfaces 42 and 22 of the housing means 12 and 11.

An annular member 44 is disposed in the open end housing means 12 and has an annular shoulder means 45 for a purpose hereinafter described.

An expansible element 46 disposed in the housing means 12 has a fixed wall 47 and a movable wall 48, the fixed wall 47 being carried on a threaded member 49 threadedly disposed in the threaded bore 40 of the housing means 12. The interior of the expansible element 46 is interconnected to a temperature sensing bulb 50 by a conduit means 51 whereby the movable wall 48 of the expansible element 46 moves to the left in FIGURE 1 when the expansible fluid in the bulb 50 expands because of an increase in temperature sensed by the bulb 50 and moves to the right in FIGURE 1 when the expansible fluid in the bulb 50 contracts because of a decrease in temperature sensed by the bulb 50.

Once the position of the expansible element 46 has been fixed relative to the housing means 12 by adjusting the threaded member 49 relative to the housing 12 in a manner hereinafter described, a lock nut 52 is rotated on the threaded member 49 against the closed end of the housing means 12 to lock the threaded member 49 and expansible element 46 in its predetermined position relative to the housing means 12. A sleeve protector 53 is disposed over the threaded member 49 and the lock nut 42 in the position illustrated in FIGURE 1.

A motion transmitting member 54 is provided and comprises annular portion 55 having inwardly directed radial fingers 56 integrally interconnected thereto. The motion transmitting member 54 is disposed in the housing means 12 and has the fingers 56 thereof disposed against the shoulder means 45 for a purpose hereinafter described.

A fulcrum member 57 is provided and has an annular shoulder 58 that is adapted to bear against the fingers 56 of the motion transmitting member 54 at a point inboard of the shoulder 45 for a purpose hereinafter described. The fulcrum member 57 is urged to the left in FIGURE 1 by a compression spring 59 having one end 60 bearing against the fulcrum member 57 and the other end 61 bearing against an annular flange 62 of a cup-shaped member 63.

The cup-shaped member 63 has an opening 64 passing centrally therethrough and receiving a pin-like member 65 having an enlarged head 66 disposed on one side of the cup shaped member 63 and on opposed large head 67 disposed outboard of a washer like member 68 disposed against the left hand side of the fulcrum member 57, the pin like member 65 respectively passing through central openings 69 and 70 in the members 56 and 68 for a purpose hereinafter described.

Figure 7:
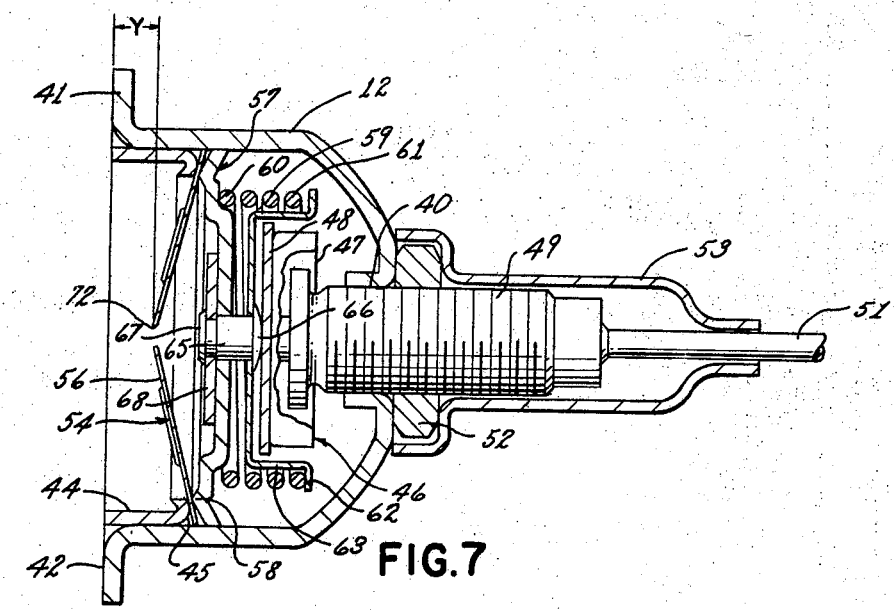
FIGURE 7 is a view similar to FIGURE 6 and illustrates the other housing means and its associated parts of the control device of FIGURE 1.

The assembly in the housing means 12 can be calibrated independently of the housing means 11 in the manner illustrated in FIGURE 7.

In particular, with the lock nut 52 and protective sleeve 53 backed away from the housing means 12, the temperature sensing bulb 50 can be placed in a bath at a controlled temperature so that expansion of the expansible element 46 will force the fulcrum member 57 to the left and fulcrum the tangs or fingers 56 against the shoulder means 45 whereby the same will have the free ends 72 thereof disposed a predetermined distance Y from the end surface 42 of the housing means 12 at the predetermined temperature. If the free ends 72 of the fingers 56 are not disposed at the predetermined distance Y from the end surface 42 of the housing means 12 when the bulb 50 has been immersed in the bath having the specified temperature, the position of the expansible element 46 can be adjusted relative to the housing means 12 by rotation of the member 49 relative to the housing means 12 so that the fingers 56 will be disposed at the predetermined distance Y.

Thereafter, the lock nut 52 is tightened against the casing means 12 with the member 49 in its adjusted position so that the housing means 12 and associated parts will have been calibrated in the above manner.

Thus, the calibrated housing means 12 can be assembled to the calibrated housing means 11 whereby the assembled housing means 11 and 12 will only produce a possible maximum temperature shift of 1° F. off the desired setting thereof.

For example, if the device 10 of this invention is to have the valve member 20 seated against the seat means 18 of the orifice plug 17 when the temperature sensing bulb 50 senses a tempertaure of 165.5° F., the housing means 12 can be calibrated by having the temperature sensing bulb 50 thereof disposed in a bath at a control temperature of 165.5° F. whereby the distance Y will be approximately 0.138 + or − .005 of an inch.

With this calibration of the housing means 12, the gasket 43 has a thickness of 0.022 + or − .005 of an inch.

Thus, it can be seen that when the gasket 43 is placed against the surface 42 of the housing means 12, the free ends 72 of the fingers 56 will be disposed approximately .160 + or − 0.010 of an inch from the end surface 22 of the housing means 11 and since the housing means 11 has been calibrated to have the end surface 39 of the retainer 31 disposed a distance of 0.160 + or − .002 of an inch beyond the end surface 22 of the housing means 11, the only possible variation in having the free ends 72 of the fingers 56 pushing the valve member 20 to the left to close against the seat surface 18 of the orifice plug 17 is + or −.012 of an inch. It has been found that in the control device 10 of this invention, a .012 of an inch variation in the position of the valve member 20 relative to the seat means 18 of the orifice plug 17 creates only a 1° F. temperature variation.

Accordingly, it can be seen that by individually calibrating the housing means 11 and 12 and their associated parts in the manner illustrated in FIGURES 6 and 7, the housing means 11 and 12 can be replaced in the field with only a maximum possible variation of a 1° F. differential in the assembled control device 10.

The operation of the control device 10 of this invention will now be described.

When the temperature sensed by the sensing bulb 50 is below the predetermined temperature of the device 10, which in the illustration above, is 165.5° F., the expansible element 46 has collapsed to such a position that the valve member 20 is adapted to move to the right until the flange 33 of the retainer 31 thereof abuts against the stop means 34 in the manner illustrated in FIGURE 2 whereby the orifice plug 17 is in its fully opened position.

Thus, fuel is adapted to flow from the inlet 15 through the outlet passage 19 and the orifice plug 17 for the intended purpose.

However, as the temperature sensed by the temperature sensing bulb 50 increases, the same causes the movable wall 48 of the expansible element 46 to move to the left and, through the compression spring 59, move the fulcrum member 57 to the left to fulcrum the fingers 56 against the shoulder means 45 and push the valve member 20 toward the seat means 18 of the orifice plug 17.

In this manner, movement of the valve member 20 to the left will throttle the flow of fuel from the inlet 15 to the outlet 19 for the desired purpose.

Should the temperature sensed by the temperature sensing bulb 50 reach 165.5° F. or above, the fulcrum member 57 is moved sufficiently to the left to cause the valve member 20 to engage against the seat means 18 of the orifice plug 17 in the manner illustrated in FIGURE 1.

However, should the expansible element 46 have the movable wall 48 thereof moved beyond the position illustrated in FIGURE 1, the pin-like means 65 is permitted to move to the position illustrated in FIGURE 3 whereby the compression spring 59 takes up the additional movement of the expansible element 46 in an overshoot manner so that the fingers 56 of the motion transmitting member 54 will not be overstressed by an overshooting of the expansible element 26.

As the temperature sensed by the temperature sensing bulb 50 decreases from the selected temperature of 165.5° F., it can be seen that the expansible element 46 collapses correspondingly whereby the natural resiliency of the fingers 56 forces the fulcrum member 57 back to the right to permit the valve member 20 to move to the right away from the seat means 18 by the force of the compression spring 35.

Thus, it can be seen that the control device 10 of this invention is readily adaptable to control the flow of fluid or fuel therethrough in response to a temperature sensed by the temperature sensing bulb 50. Further, the control device 10 of this invention readily permits the different assemblies thereof to be individually calibrated when assembled so that the same can be replaced in the field without requiring further calibration of the parts in the field.

While specific temperatures and dimensions have been given above, it is to be understood that the same are not a limitation on this invention and are merely presented for the purpose of illustrating one working embodiment of this invention.

Accordingly, it can be seen that not only does this invention provide an improved control device or the like, but also this invention provides improved parts for such a control device or the like.

While the form of the invention now preferred has been disclosed as required by the statutes, other forms may be used, all coming within the scope of the claims which follow.

What is claimed is:

1. In combination, a housing means having a shoulder means, a movable member carried by said housing means, a motion transmitting member having one side thereof disposed against said shoulder means, a fulcrum member disposed against the other side of said motion transmitting member at a point outboard of said shoulder means, and coiled spring means disposed between said fulcrum member and said movable member to space the same from each other while operatively interconnecting said movable member to said fulcrum member to cause said motion transmitting member to fulcrum on said shoulder means in response to movement of said movable member.

2. A combination as set forth in claim 1 wherein said coiled spring means comprises a coiled compression spring.

3. A combination as set forth in claim 1 wherein said motion transmitting member has a natural tendency to separate said shoulder means and said fulcrum member.

4. A combination as set forth in claim 1 wherein a valve member is carried by said housing means and is controlled by movement of said motion transmitting member.

5. In combination, a housing means having a shoulder means, a movable member carried by said housing means, a motion transmitting member having one side thereof disposed against said shoulder means, a fulcrum member disposed against the other side of said motion transmitting member at a point outboard of said shoulder means, a coiled compression spring operatively disposed between said movable member and said fulcrum member to space said members from each other and to cause said motion transmitting member to fulcrum on said shoulder means in response to movement of said movable member, and means for permitting said movable member to overshoot when said motion transmitting member has been fulcrumed to a predetermined position.

6. A combination as set forth in claim 5 wherein said overshoot means comprises a retainer movably carried by said fulcrum member and biased into engagement with said movable member by said spring.

7. A combination as set forth in claim 6 wherein said retainer has stop means limiting the amount of movement of said retainer away from said fulcrum member.

8. In combination, a housing means having a shoulder means, a condition responsive means carried by said housing means and having a portion movable relative to said housing means, a motion transmitting member having one side thereof disposed against said shoulder means, a fulcrum member disposed against the other side of said motion transmitting member at a point outboard of said shoulder means, and coiled spring means disposed between said fulcrum member and said movable portion to space the same from each other while operatively interconnecting said movable portion of said condition responsive means to said fulcrum member to cause said motion transmitting member to fulcrum on said shoulder in response to movement of said movable portion of said condition responsive means.

9. A combination as set forth in claim 8 wherein said motion transmitting member comprises an annular portion having inwardly directed radial tangs.

10. A combination as set forth in claim 8 wherein said housing means includes a housing member having a cavity and an annular member disposed in said cavity and forms said shoulder means.

11. A combination as set forth in claim 8 wherein said condition responsive means is adjustable relative to said housing means.

12. A combination as set forth in claim 8 wherein said fulcrum member has an annular ridge disposed against said motion transmitting member.

13. In combination, a housing means having a valve seat means, a valve member cooperable with said valve seat means and having a stem portion, a cup-shaped retainer telescopically disposed over said stem portion, spring means carried by said housing to tend to move said valve member away from said valve seat means, said housing means having a shoulder maens, a movable member carried by said housing means, a motion transmitting member having one side thereof disposed against said shoulder means and said retainer, a fulcrum member disposed against the other side of said motion transmitting member at a point outboard of said shoulder means, and coiled spring means operatively interconnecting said movable member to said fulcrum member to cause said motion transmitting member to fulcrum on said shoulder means and move said valve member in response to movement of said movable member.

14. A combination as set forth in claim 13 wherein said movable member forms part of a condition responsive means carried by said housing means.

15. A combination as set forth in claim 13 wherein said housing means comprises two separate parts one of which carries said valve member and the other of which carries said motion transmitting member and its associated parts.

16. A combination as set forth in claim 13 wherein said container has a flange means and said spring means engages said flange means.

17. A combination as set forth in claim 13 wherein said housing means carries stop means to limit movement of said valve member away from said valve seat means.

18. A combination as set forth in claim 13 wherein said retainer is press fitted on said stem portion.

References Cited

UNITED STATES PATENTS

| | | | |
|---|---|---|---|
| 2,308,944 | 1/1943 | Turco | 251—322 X |
| 2,614,754 | 10/1952 | Caparone | 236—99 X |
| 2,659,570 | 11/1953 | Worker et al. | 251—278 |
| 2,713,988 | 7/1955 | Kitterman | 251—322 |
| 2,822,135 | 2/1958 | Winslow | 236—99 |
| 2,993,646 | 7/1961 | Jackson et al. | 236—99 |
| 3,163,359 | 12/1964 | Ages | 236—99 X |
| 3,204,686 | 9/1965 | Thomson | 236—99 X |
| 3,223,380 | 12/1965 | Hochmuth et al. | 251—284 |

M. CARY NELSON, *Primary Examiner.*

S. SCOTT, *Assistant Examiner.*